March 23, 1954  C. J. SMITH  2,672,704
FISHING TACKLE
Filed Feb. 2, 1950
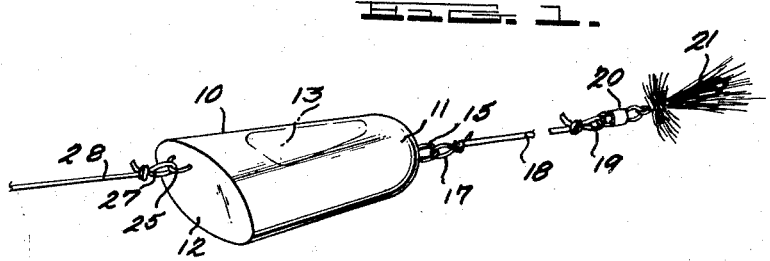
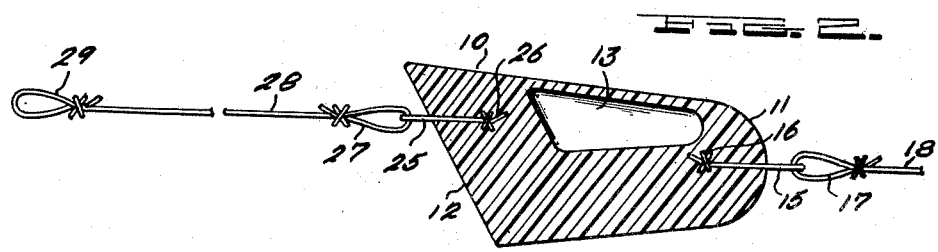
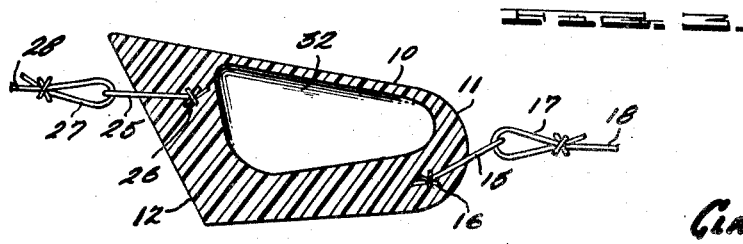
INVENTOR
CLARENCE J. SMITH
BY Parker and Walsh
ATTORNEYS Patented Mar. 23, 1954

2,672,704

UNITED STATES PATENT OFFICE 2,672,704

FISHING TACKLE

Clarence J. Smith, Lewistown, Ill.

Application February 2, 1950, Serial No. 141,981

3 Claims. (Cl. 43—43.1)

This invention relates to fishing tackle, and more particularly to a weight or weight assembly for use with various types of baits, lures and fishing poles. This application is a continuation-in-part of my co-pending application, Serial No. 78,811, filed February 28, 1949, now abandoned.

An important object of the invention is to provide a novel type of weight by means of which fishing enthusiasts may, if they desire, use a conventional casting rod for various types of fishing, it being possible with such rod to practice fly fishing and to secure three or four times the casting distance which can be attained with a fly rod.

A further object is to provide such a device which, because of its inherent nature, permits the bait or lure to attract the fish without their being distracted by other visible moving elements or devices adjacent the bait or lure.

A further object, more specifically, is to provide a device which has the mass or weight to facilitate casting with any type of bait or lure, and wherein the mass or weight is clear and substantially colorless, and preferably water white, so as to be substantially invisible to the fish so that the latter will be more effectively attracted by the bait or lure.

A further object is to provide such a mass or weight in combination with substantially invisible leader sections extending therefrom, one of which is connected to the bait or lure and the other of which is connected to the fishing line, thus providing a relatively long section of assembled elements of substantially invisible nature between the fishing line and the bait or lure so that the latter will form the sole means attracting the notice of fish.

A further object is to provide in such an assembly of elements a mass or weight of such character that by alternately twitching the rod tip and reel handle, the device will perform various maneuvers in the water while remaining substantially invisible to the fish so that the bait or lure appears to wander around in the water to present to the fish the appearance of live bait.

A further object is to provide a novel mass or weight element which can be readily economically formed of a given shape and size through a process of molding, with the device including an occluded air bubble to determine the specific gravity of the device and thus predetermine whether the device will float for surface fishing or trolling, or whether it will sink for still fishing substantially below the surface of the water.

Other objects and advantages of the invention will become apparent during the course of the following description.

In the drawing, I have shown two embodiments of the invention. In this showing,

Figure 1 is a perspective view of the device, portions of the leader sections being broken away and one of the leader sections being shown with a conventional fishing fly attached thereto, Figure 2 is a vertical longitudinal sectional view through the weight element, associated elements being shown in operative association therewith, and Figure 3 is a similar view showing a slightly modified form of the device.

Referring to Figures 1 and 2, the numeral 10 designates a plug-like body preferably molded of a plastic material, such as Lucite, or a methyl methacrylate resin. The body 10 is clear and uncolored, and preferably is water white to reduce to a minimum its visibility in the water. The body 10 preferably is slightly tapered to decrease in size toward one end, and such end is rounded as at 11. The opposite end of the body 10 is provided with a flat sloping face 12 for a purpose to be described. In the molding thereof, the body 10 is provided in the top portion thereof with an occluded air bubble 13 as clearly shown in Figure 2 to lower the specific gravity of the body for a purpose which will become apparent.

At its rear or rounded end, the body 10 is provided with an attaching loop 15. This loop is formed of clear uncolored material, preferably water white high test nylon. This loop has its ends knotted as at 16 and imbedded in the body 10 when the latter is molded, whereby the loop 15 is permanently connected to the body 10. This loop 15 is connected to a loop 17 formed on the adjacent end of a leader section 18, formed of the same material as the loop 15, being clear and uncolored and preferably formed of water white nylon. The rear end of the leader section 18 is provided with a loop 19 to which is connected a quick-detachable fastener 20 to which the desired bait or lure is to be connected. In the present case, I have shown a conventional fly 21 connected to the fastener 20.

At its forward end, the body is provided with a second loop 25 similar to the loop 15 and having knotted ends 26 imbedded in the body 10 in the molding thereof to permanently connect the loop 25 thereto. This loop is connected to a loop 27 formed on the rear end of a leader section 28, the forward end of which is provided with a knotted loop 29 for the attachment of the fishing line to the leader 28.

In the form of the invention described above, the body 10 has a comparatively small air bubble 13 occluded therein, in which case the weight or specific gravity of the body 10 is slightly greater than the specific gravity of water. The body 10 in such case serves not only as a weight in the casting of the line, but also serves as a sinker for below-surface fishing. The form of the invention shown in Figure 3 is substantially identical with the form described above and the same parts are indicated by the same reference numerals. In the modified form of the invention, a larger air bubble 32 is molded into the body 10 so that the specific gravity of the body is equal to or slightly less than the specific gravity of water. Therefore, the modified form of the body 10 will float and travel on or adjacent the surface of the water. In each case, the air bubble is toward the top of the body and, accordingly, the bottom of the body in each case is heavier, thus causing the body to remain or travel in the normal position shown.

Operation

Each of the leaders 18 and 28, in the preferred practice of the invention, is approximately one foot long, thus providing an assembly of elements comprising the two leader sections, the two loops 15 and 25 and the body 10, all of which are transparent and uncolored, and preferably water white so as to be substantially invisible in the water. Preferably, this combination of elements is manufactured and sold as a unit which is highly convenient in use since it merely is necessary to tie the end of the fishing line to the loop 29 and to snap the bait or lure on the fastener 20. Fish attracted to the bait or lure will see this element, but the nearest visible element will be over two feet away, namely the end of the fishing line connected to the loop 29. The attention of the fish accordingly will be centered on the bait or lure and there will be no nearby objects or elements which will distract the attention of the fish or, when moving, frighten the fish away from the bait.

The present device makes it wholly feasible for bait casting enthusiasts to use flies, and the mass of the body 10 is such that the fisherman can make casts three or four times the distance of a fly rod cast, and to do this from positions from which it would be impossible to cast a fly rod. It is thus possible for the casting rod fisherman to cover more water and to do it much easier than can be accomplished with a conventional fly rod.

The plug 10 makes a perfect casting weight and ordinarily will weigh approximately one-half ounce. It is so designed in shape, with the undercut face 12, as to multiply each twitch of the rod tip or reel handle to cause the body 10 to partake of different movement in the water and thus cause the bait or lure to appear to the fish as live bait moving under its own power. Particular attention is invited to the fact that these results are obtained through the use of a body 10 and the elements associated therewith which are invisible or substantially invisible to the fish and accordingly the different motions of the bait or lure are accomplished without distracting the attention of the fish to the elements which cause the movement of the bait. Accordingly, the device has been found amazingly effective in increasing catches of many kinds of fish with various types of fishing equipment.

For example, the device enables casting rod, surf casting and spinning rod enthusiasts to use hair and feather flies and all other types of miniatures much more effectively than can be done with conventional tackle.

The division of the nylon leader into two sections 18 and 28 is important not only in providing the invisible connection between the fishing line and the bait or lure, but also prevents the body 10, due to its greater weight, from traveling faster than the leader in the rear and tangling therewith. Tangling is further prevented by tying the rear leader to its associated loop with a rigid knot, preventing any free action at this point. The spring tendency of the short section of nylon to the rear of the plug prevents any folding back and tangling thereof.

The air chambers in the two forms of the invention shown are in the upper portion of the plug to provide correct balance and prevent rotation of the body and the twisting of the line. The air bubble 13 reduces the specific gravity of the body and thus reduces the sinking speed of the plug, thus enabling the fisherman to fish at any desired depth with a slight varying of the retrieving speed, using light artificial lures on heavy duty casting rods very effectively. Obviously, the form of the device in Figures 1 and 2 provides a sinking body 10, while the air bubble 32 of Figure 3, being of larger size, provides the modified type of body with the necessary buoyancy to float at or near the surface. In such case, the fisherman is enabled to fish on or near the surface using small artificial lures very effectively.

Particular attention is invited to the fact that the present device is not in the nature of a bait or lure, but is strictly a casting rig which is made as invisible as possible to the fish to avoid attracting the attention of the fish, as distinguished from the provisions of lures the purpose of which is to attract the fish as strongly as possible. The body 10 has little or no action of its own when retrieved steadily, but imparts to the bait or lure an attractive bait action by alternately effecting twitches on the rod tip and reel handle.

I claim:

1. A fishing tackle assembly comprising a one-pece transparent water white body of molded material having an occluded air bubble therein to reduce the specific gravity of said body to the desired degree depending upon whether said body is to float or sink, attaching means at the respective ends of said body each comprising a clear transparent thread-like loop having its end knotted and embedded in the molded material of said body for permanent connection therewith, and clear transparent leaders connected to the respective attaching means, said body being free of metal and other color imparting objects and attachments so as to form, with said clear, transparent attaching means and leaders, a fishing tackle assembly which is substantially invisible in water.

2. A fishing tackle assembly as set forth in claim 1 in which said body has a substantially flat face at one end thereof sloping downwardly and inwardly relative to said body, and said occluded air bubble is so positioned with respect to said substantially flat face that the latter will slope downwardly and inwardly when the body is disposed in the water.

3. A fishing tackle assembly as set forth in claim 2 in which said body is tapered from said downwardly and inwardly sloping face end toward the opposite end and terminates in a rounded end portion.

CLARENCE J. SMITH.

References Cited in the file of this patent

UNITED STATES PATENTS

| Number | Name | Date |
|---|---|---|
| 1,336,227 | Hayes | Apr. 6, 1920 |
| 1,866,289 | Boehm | July 5, 1932 |
| 1,892,892 | Jamar, Jr. | Jan. 3, 1933 |
| 1,897,291 | Andrews | Feb. 14, 1933 |
| 2,112,385 | Smith | Mar. 29, 1938 |
| 2,117,206 | Neff | May 10, 1938 |
| 2,119,504 | Lawrence | May 31, 1938 |
| 2,130,948 | Carothers | Sept. 20, 1938 |
| 2,263,340 | Kraemer | Nov. 18, 1941 |
| 2,275,076 | Haynes | Mar. 3, 1942 |
| 2,288,595 | Peterson | July 7, 1942 |
| 2,515,175 | Arbogast | July 18, 1950 |

FOREIGN PATENTS

| Number | Country | Date |
|---|---|---|
| 566,753 | Great Britain | Jan. 11, 1945 |